(12) United States Patent
Tanaka

(10) Patent No.: US 8,341,575 B2
(45) Date of Patent: Dec. 25, 2012

(54) CIRCUIT DESIGN DEVICE, CIRCUIT DESIGN METHOD, AND CIRCUIT DESIGN PROGRAM

(75) Inventor: Katsunori Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 330 days.

(21) Appl. No.: 12/595,828

(22) PCT Filed: Apr. 15, 2008

(86) PCT No.: PCT/JP2008/057357
§ 371 (c)(1),
(2), (4) Date: Oct. 13, 2009

(87) PCT Pub. No.: WO2008/133116
PCT Pub. Date: Nov. 6, 2008

(65) Prior Publication Data
US 2010/0115488 A1 May 6, 2010

(30) Foreign Application Priority Data
Apr. 24, 2007 (JP) .................................. 2007-114382

(51) Int. Cl.
*G06F 9/455* (2006.01)
*G06F 17/50* (2006.01)
(52) U.S. Cl. ....................................... 716/113; 716/126
(58) Field of Classification Search .................... 716/113
See application file for complete search history.

(56) References Cited

U.S. PATENT DOCUMENTS

| 7,424,694 B2 * | 9/2008 | Ikeda | 716/113 |
| 7,487,475 B1 * | 2/2009 | Kriplani et al. | 716/136 |
| 2005/0160392 A1 * | 7/2005 | Sandbote | 716/18 |

FOREIGN PATENT DOCUMENTS

| JP | 2002222232 A | 8/2002 |
| JP | 2006277359 A | 10/2006 |
| JP | 2007094512 A | 4/2007 |

OTHER PUBLICATIONS

International Search Report for PCT/JP2008/057357 mailed May 13, 2008.
J. Sparso et al., "Principles of Asynchronous Circuit Design", Kluwer Academic Publishers, 2001, pp. 16-27.
K. Ohashi et al., "Statistical Analysis Driven Synthesis of Application Specific Asynchronous Systems", IEICE Transactions on Fundamentals of Electronics, Communications and Computer Sciences, Mar. 1, 2007, vol. E90-A, No. 3, pp. 659-669.
H. Saito et al., "Synthesis of Asynchronous Control Circuits Based on Cell Controllers", The Institute of Electronics, Information and Communication Engineers, Technical Report of IEICE, Nov. 21, 2003, vol. 103, No. 478, pp. 79-84.

\* cited by examiner

*Primary Examiner* — Jack Chiang
*Assistant Examiner* — Eric Lee

(57) ABSTRACT

A circuit design device comprises a logic synthesis unit that generates a circuit with reference to a circuit design description, a statistical timing analysis unit that obtains a probability distribution of delay times of a path in a circuit, a relative delay restriction fulfillment rate calculation unit that obtains a fulfillment rate of the relative delay restriction according to the probability distribution of the delay time from the same starting point at each restricted path subjected to the relative delay restriction, a path delay probability distribution changing unit that changes the probability distribution of delay times of the restricted path to changed probability distribution when the fulfillment rate does not reach a predetermined rate, and a logic circuit structure changing unit that changes the structure of the circuit so as to follow the changed probability distribution.

20 Claims, 5 Drawing Sheets

FIG. 3

```
module data_path(A, B, C, Lt1, Lt2);
   input  [31:0] A, B;
   output [31:0] C;
   input         Lt1, Lt2 reg   [31:0]  a, b, c;
   wire  [31:0]  y;

assign y = a+b;

always @ (Lt1) begin
      If(Lt1) begin a <= A; b <= B; end
      else begin a <= a; b <= b; end
   end always @ (Lt2) begin
      if(Lt2) c <= y;
      else c <= c;
   end
endmodule module top (A, B, C, Ri, Ai, Ro, Ao);
   input [31:0] A, B;
   output [31:0] C;
   input Ri, Ao;
   output Ai, Ro;

wire Lt1, Lt2, Ro1, Ao1, Ri2, Ai2;
   LatchCtrl lc1(Lt1, Ri,  Ai,   Ro1, Ao1);
   LatchCtrl lc2(Lt2, Ri2, Ai2,  Ro,  Ao);
   assign Ri2 = Ro1;
   assign Ao1 = Ai2;

data_path dp(A, B, C, Lt1, Lt2);
endmodule
```

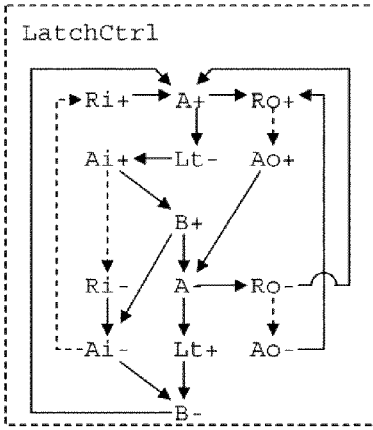

CIRCUIT DESIGN DEVICE, CIRCUIT DESIGN METHOD, AND CIRCUIT DESIGN PROGRAM

This application is the National Phase of PCT/JP2008/057357, filed Apr. 15, 2008, which is based upon and claims the benefit of the priority of Japanese patent application No. 2007-114382 filed on Apr. 24, 2007, the disclosure of which is incorporated herein in its entirety by reference thereto.

TECHNICAL FIELD

The present invention relates to a circuit design device, circuit design method, and circuit design program, and particularly to a circuit design device, circuit design method, and circuit design program that take variation in delays (delay times) of a circuit element and wiring into consideration.

BACKGROUND ART

In recent years, since variation in delays of an element and wiring has increased due to miniaturization, it has become more difficult to perform a timing design of an integrated circuit.

Even though same elements and wirings in terms of design are used, variation in characteristic values such as a size and impurity concentration occurs between elements and wirings mounted on different chips at a time of manufacturing. As a result, variation occurs in delay values (delay times) of the elements and wirings.

In conventional timing design methods, a maximum delay value and a minimum delay value within a range of variation among such elements and wirings are used, and a maximum value and a minimum value of a circuit delay (i.e. a delay time per circuit) are calculated from the maximum delay value and the minimum delay value of elements and wirings in the circuit.

Then, a variation of a circuit delay is equal to an accumulation of variations of elements and wirings.
Patent Document 1:
  Japanese Patent Kokai Publication No. JP-P2002-222232A
Patent Document 2:
  Japanese Patent Kokai Publication No. JP-P2006-277359A
Non-Patent Document 1:
  Sparso, J., Furber, S., "Principles of Asynchronous Circuit Design," Kluwer Academic Publishers, 2001, pp. 16-27

SUMMARY

The entire disclosures of the above-mentioned Patent Documents 1 and 2, and Non-Patent Document 1 are incorporated herein by reference thereto. An analysis on the related technologies by the present inventor will be given below.

Elements or wirings with a delay larger than an expected value and elements or wirings with a delay smaller than the expected value are mixed in a circuit, therefore variation in delays of the elements and wirings will be cancelled in most cases.

Therefore, in the circuit delay calculation method (of the conventional timing design methods) described above, since the variation of the circuit delay is estimated to be larger than the variation that may occur in a chip actually manufactured (i.e., the variation is overestimated), the circuit delay may be estimated to be larger or smaller than necessary.

When the circuit delay is estimated to be larger than necessary, since the circuit delay restriction imposed in the timing design becomes more severe than necessary, the convergence of the timing design is deteriorated (i.e., it takes more time to design a circuit satisfying the circuit delay restriction).

On the other hand, when the circuit delay is estimated to be smaller than necessary, the production yield decreases since many chips manufactured do not meet the timing restriction despite the fact that these chips satisfy the timing restriction in terms of design.

As timing design methods to cope with increased variation, there are a design method using a statistical timing analysis technique and an asynchronous circuit design method.

The statistical timing analysis technique is a timing analysis technique in which the delay of an element, wiring and a circuit is treated as a probability distribution instead of a single real number value, and the circuit delay is calculated by performing a statistical operation on the probability density function of the delay value of the element and wiring (Patent Documents 1 and 2).

By employing the statistical timing analysis technique in the timing design, the circuit delay is estimated accurately while considering variation, and the convergence of the timing design and the production yield are both maintained at a good level.

The asynchronous circuit is a circuit that controls the operation timing of a latch and flip-flop in the circuit using a handshake signal instead of a clock signal.

In a synchronous circuit, all latches and flip-flops are driven simultaneously in synchronization with a clock signal, however, in the asynchronous circuit, a pair of the handshake signals notifying request and completion of data reception is communicated between a hitch and a flip-flop between which data is transmitted and received, and each latch and flip-flop is driven in its own timing according to the state of the handshake signals (Non-Patent Document 1).

Since the asynchronous circuit operates accurately as long as the handshake signals change in a specified order even if the time required for a transition becomes long, the timing design is facilitated even when the variation of the delay time is large.

In the timing design for the asynchronous circuit, unlike the synchronous circuit, in order to satisfy relative relationships in terms of delay (called "relative delay restriction" hereinafter) between a plurality of paths in the circuit, the circuit including the plurality of paths under the restriction is optimized.

For instance, when an asynchronous circuit in bundled-data implementation is designed, a relative delay restriction that a delay value of a data path must be smaller than that of one of the corresponding handshake lines is imposed.

Meanwhile, in a circuit using QDI (Quasi Delay Insensitive) delay model, a relative delay restriction that delays between branch points in the circuit must be approximately equal to each other is imposed.

In order to satisfy these relative delay restrictions, the circuit is optimized so that the delay time of some of the paths subjected to the relative delay restrictions is decreased and the delay time of others is increased concurrently.

In a synchronous circuit, the delay time of a data path circuit is made shorter than the clock cycle time in the timing design, therefore no restrictive condition regarding relative relationships between the delay times of a plurality of paths is imposed. Therefore, the relative delay restriction is a design restriction specific to the timing design of the asynchronous circuit.

As described above, since a timing design is necessary in designing an asynchronous circuit, it is necessary to take the aforementioned variation in the delay value of a circuit element and wiring into consideration in the timing design of the asynchronous circuit.

As a simple method for improving the yield even when variation in delay values increases in the asynchronous design technology, the timing design is performed while keeping a margin so as to satisfy the relative delay restriction.

For instance, in an asynchronous circuit in bundled-data implementation, a data path and the request line of the corresponding handshake lines have a restriction that the data path delay time must be shorter than the delay time of the request line.

When the timing design of the asynchronous circuit in bundled data implementation that takes variation into consideration is performed, by inserting a predetermined margin in a difference between the data path delay and the request line delay, the relative delay restriction will be satisfied even if variation increases the data path delay or decreases the request line delay, and the yield is improved.

On the other hand, a superfluous timing margin, for the purpose of improving the yield, may slow down the processing speed of the asynchronous circuit.

In bundled data implementation, since the processing speed of the asynchronous circuit is determined by the longest handshake signal delay, insertion of a timing margin into the handshake signal line slows down the processing speed.

As described above, it is necessary to devise a timing design method, for an asynchronous circuit, capable of securing and improving the yield without unnecessarily slowing down the processing speed even when variation in delay values of an element and wiring increases.

The problem with the conventional technologies is that it is difficult to achieve both a high yield and good performance in designing an asynchronous circuit when variation in delay values of an element and wiring is large.

The reason is that the conventional timing design methods coping with variation are for designing synchronous circuits and do not satisfy the relative delay restriction specific to asynchronous circuits. Furthermore, the conventional design methods for asynchronous circuits do not include timing design that takes variation in delay values into consideration.

Therefore, it is an object of the present invention to provide a circuit design device, circuit design method, and circuit design program capable of achieving suitable timing design and a high yield even when delay times of an element or wiring vary in an asynchronous circuit subjected to a relative delay restriction.

A circuit design device according to a first aspect of the present invention is a circuit design device designing a circuit that includes a plurality of paths subjected to a restriction regarding the relative amounts of their delay times (termed "relative delay restriction" hereinafter), and comprising:

a statistical timing analysis unit that derives a probability distribution of delay times of each path included in the circuit;

a relative delay restriction fulfillment rate calculation unit that derives a fulfillment rate of the relative delay restriction based on the probability distribution of delay times from a single starting point in each path of a pair of paths (termed "restricted path pair" hereinafter) subjected to the relative delay restriction;

a path delay probability distribution changing unit that changes the probability distribution of delay times of each path of the restricted path pair to a changed probability distribution when the fulfillment rate does not reach a predetermined rate; and a logic circuit structure changing unit that changes the structure of the circuit so that the circuit follows the changed probability distribution. (mode 1)

A circuit design method according to a second aspect of the present invention is a circuit design method designing a circuit that includes a plurality of paths subjected to a restriction regarding relative amounts of their delay times (termed "relative delay restriction" hereinafter), and comprising:

(a) generating the circuit based on a circuit design description;

(b) deriving a probability distribution of delay times of each path included in the circuit;

(c) deriving a fulfillment rate of the relative delay restriction based on the probability distribution of delay times from a single starting point in each path of a pair of paths (called "restricted path pair" hereinafter) subjected to the relative delay restriction;

(d) changing the probability distribution of delay times of each path of the restricted path pair to a changed probability distribution when the fulfillment rate does not reach a predetermined rate; and (e) changing the structure of the circuit so that the circuit follows the changed probability distribution. (mode 12)

A circuit design program according to a third aspect of the present invention is a circuit design program designing a circuit that includes a plurality of paths subjected to a restriction regarding the relative amounts of their delay times (termed "relative delay restriction" hereinafter), and causing a computer to execute the processings of:

(a) generating the Circuit based on a circuit design description;

(b) deriving a probability distribution of delay times of each path included in the circuit;

(c) deriving a fulfillment rate of the relative delay restriction based on the probability distribution of delay times from a single starting point in each path of a pair of paths (called "restricted path pair" hereinafter) subjected to the relative delay restriction;

(d) changing the probability distribution of delay times of each path of the restricted path pair to a changed probability distribution when the fulfillment rate does not reach a predetermined rate; and (e) changing the structure of the circuit so that the circuit follows the changed probability distribution. (mode 22)

The circuit design device according to an exemplary aspect of the present invention comprises a logic synthesis unit that generates the circuit with reference to a circuit design description. (mode 2)

The circuit design device according to a first exemplary aspect of the present invention comprises a control unit that controls so that the fulfillment rate reaches the predetermined rate by repeatedly operating the statistical timing analysis unit, the relative delay restriction fulfillment rate calculation unit, the path delay probability distribution changing unit, and the logic circuit structure changing unit. (mode 3)

In the circuit design device according to a second exemplary aspect of the present invention, the control unit changes the probability distribution of delay times so as to decrease a delay time of a path, out of the restricted path pair, subjected to the relative delay restriction that its delay time is shorter than that of the other path, and derives the fulfillment rate; and when the fulfillment rate does not reach the predetermined rate, the control unit changes the probability distribution of delay times so as to increase the delay time of a path, out of the restricted path pair, subjected to the relative delay restriction that its delay time is longer than that of the other path. (mode 4)

In the circuit design device according to a third exemplary aspect of the present invention, the relative delay restriction fulfillment rate calculation unit derives the fulfillment rate based on a joint probability distribution where a signal transmission is completed in a path, out of the restricted path pair, subjected to the relative delay restriction that its delay time is shorter than that of the other path, and signal transmission is not completed in a path, out of the restricted path pair, subjected to the relative delay restriction that its delay time is longer than that of the other path. (mode 5)

In the circuit design device according to a fourth exemplary aspect of the present invention, the fulfillment rate is derived based on a probability distribution of delay times of each path of the restricted path pair and a correlation between the probability distributions. (mode 6)

In the circuit design device according to a fifth exemplary aspect of the present invention, a statistic that characterizes a probability distribution is used as the changed probability distribution. (mode 7)

In the circuit design device according to a sixth exemplary aspect of the present invention, the statistical timing analysis unit derives a probability distribution of delay times of a path in the circuit referring to a predetermined probability density function of delay times of an element and wiring. (mode 8)

In the circuit design device according to a seventh exemplary aspect of the present invention, the statistical timing analysis unit forces delay times of an element, wiring, and path in the circuit to regress to a predetermined probability distribution model. (mode 9)

In the circuit design device according to an eighth exemplary aspect of the present invention, the statistical timing analysis unit chooses a normal distribution as the probability distribution model and calculates a delay time of a path in the circuit using an expected value and standard deviation as feature values of the probability density function. (mode 10)

In the circuit design device according to a ninth exemplary aspect of the present invention, the logic synthesis unit generates a netlist at a gate level based on an asynchronous circuit design description;

the timing analysis unit derives a probability distribution of delay times of a path based on the netlist or a layout wiring information; and the device comprises a layout wiring unit that arranges an element in the netlist and wires between elements, and a layout wiring changing unit that changes a physical structure of the circuit. (mode 11)

The circuit design method according to a tenth exemplary aspect of the present invention includes (f) repeating steps (b) to (e) until the fulfillment rate reaches the predetermined rate. (mode 13)

In the circuit design method according to an eleventh exemplary aspect of the present invention, in step (f), the probability distribution of delay times is changed so as to decrease the delay time of a path, out of the restricted path pair, subjected to the relative delay restriction that its delay time is shorter than that of the other path, and the fulfillment rate is derived; and when the fulfillment rate does not reach the predetermined rate, the probability distribution of delay times is changed so as to increase the delay time of a path, out of the restricted path pair, subjected to the relative delay restriction that its delay time is longer than that of the other path. (mode 14)

In the circuit design method according to a twelfth exemplary aspect of the present invention, in step (c), the fulfillment rate is derived based on a joint probability distribution where a signal transmission is completed in a path, out of the restricted path pair, subjected to the relative delay restriction that its delay time is shorter than that of the other path, and a signal transmission is not completed in a path, out of the restricted path pair, subjected to the relative delay restriction that its delay time is longer than that of the other path. (mode 15)

In the circuit design method according to a thirteenth exemplary aspect of the present invention, in step (c), the fulfillment rate is derived based on a probability distribution of delay times of each path of the restricted path pair and a correlation between the probability distributions. (mode 16)

In the circuit design method according to a fourteenth exemplary aspect of the present invention, a statistic that characterizes a probability distribution is used as the changed probability distribution in step (d). (mode 17)

In the circuit design method according to a fifteenth exemplary aspect of the present invention, a probability distribution of delay times of a path in the circuit is derived referring to a predetermined probability density function of delay times of an element and wiring in step (b). (mode 18)

In the circuit design method according to a sixteenth exemplary aspect of the present invention, delay times of an elements, wiring, and path in the circuit are forced to regress to a predetermined probability distribution model in step (b). (mode 19)

In the circuit design method according to a seventeenth exemplary aspect of the present invention, a normal distribution is chosen as the probability distribution model and the delay time of a path in the circuit is calculated using an expected value and standard deviation as feature values of the probability density function in step (b). (mode 20)

In the circuit design method according to an eighteenth exemplary aspect of the present invention, a netlist at a gate level is generated based on an asynchronous circuit design description in step (a);

a probability distribution of delay times of a path is derived based on the netlist or layout wiring information in step (b);

an element in the netlist is arranged and wiring between the elements is performed in step (e); and the method includes (g) changing a physical structure of the circuit. (mode 21)

The circuit design program according to a nineteenth exemplary aspect of the present invention causes a computer to execute (f) repeating the processes (b) to (e) until the fulfillment rate reaches the predetermined rate. (mode 23)

The circuit design program according to a twentieth exemplary aspect of the present invention causes a computer to execute, in process (f), changing the probability distribution of delay times so as to decrease the delay time of a path, out of the restricted path pair, subjected to the relative delay restriction that its delay time is shorter than that of the other path; deriving the fulfillment rate; and changing the probability distribution of the delay time so as to increase the delay time of a path, out of the restricted path pair, subjected to the relative delay restriction that its delay time is longer than that of the other path when the fulfillment rate does not reach the predetermined rate. (mode 24)

The circuit design program according to a twenty-first exemplary aspect of the present invention causes a computer to execute, in process (c), deriving the fulfillment rate based on a joint probability distribution where a signal transmission is completed in a path, out of the restricted path pair, subjected to the relative delay restriction that its delay time is shorter than that of the other path, and a signal transmission is not completed in a path, out of the restricted path pair, subjected to the relative delay restriction that its delay time is longer than that of the other path. (mode 25)

The circuit design program according to a twenty-second exemplary aspect of the present invention causes a computer to execute, in process (c), deriving the fulfillment rate based on a probability distribution of delay times of each path of the restricted path pair and a correlation between the probability distributions. (mode 26)

In the circuit design program according to a twenty-third exemplary aspect of the present invention, a statistic that characterizes a probability distribution is used as the changed probability distribution in process (d). (mode 27)

The circuit design program according to a twenty-fourth exemplary aspect of the present invention causes a computer to execute deriving a probability distribution of delay times of a path in the circuit referring to a predetermined probability density function of delay times of an element and wiring in process (b). (mode 28)

The circuit design program according to a twenty-fifth exemplary aspect of the present invention causes a computer to execute forcing delay times of an element, wiring, and path in the circuit to regress to a predetermined probability distribution model in process (b). (mode 29)

The circuit design program according to a twenty-sixth exemplary aspect of the present invention causes a computer to execute choosing a normal distribution as the probability distribution model and calculating a delay time of a path in the circuit using an expected value and standard deviation as feature values of the probability density function in process (b). (mode 30)

The circuit design program according to a twenty-seventh exemplary aspect of the present invention causes a computer to execute:

generating a netlist at a gate level based on an asynchronous circuit design description in process (a):

deriving a probability distribution of delay times of a path based on the netlist or layout wiring information in process (b);

arranging an element in the netlist and wiring between the elements in process (e); and (g) changing a physical structure of the circuit. (mode 31)

According to the circuit design device, the circuit design method, and the circuit design program according to the present invention, it is possible to achieve both suitable timing design and a high yield even when delays of an element or wiring vary in an asynchronous circuit subjected to a relative delay restriction.

The reason is that a timing yield is accurately predicted by calculating a fulfillment rate of the relative delay restriction based on a probability distribution of delay values of a path in the circuit obtained by a statistical timing analysis, the probability distribution of delay values of paths subjected to the relative delay restriction in a case where the restriction is satisfied is derived when the predicted timing yield does not satisfy a predetermined timing yield restriction, and a timing margin provided between the delay values of paths subjected to the relative delay restriction can be kept to a required minimum value by changing the logical structure or the physical structure of the circuit so that the probability distribution of the delay values of paths becomes the derived probability distribution.

BRIEF DESCRIPTION OF THE DRAWINGS

FIG. 3 is an example of an asynchronous circuit design description (i.e., an asynchronous circuit design description in a circuit design device according to an example of the present invention).

PREFERRED MODES

Figure 1:
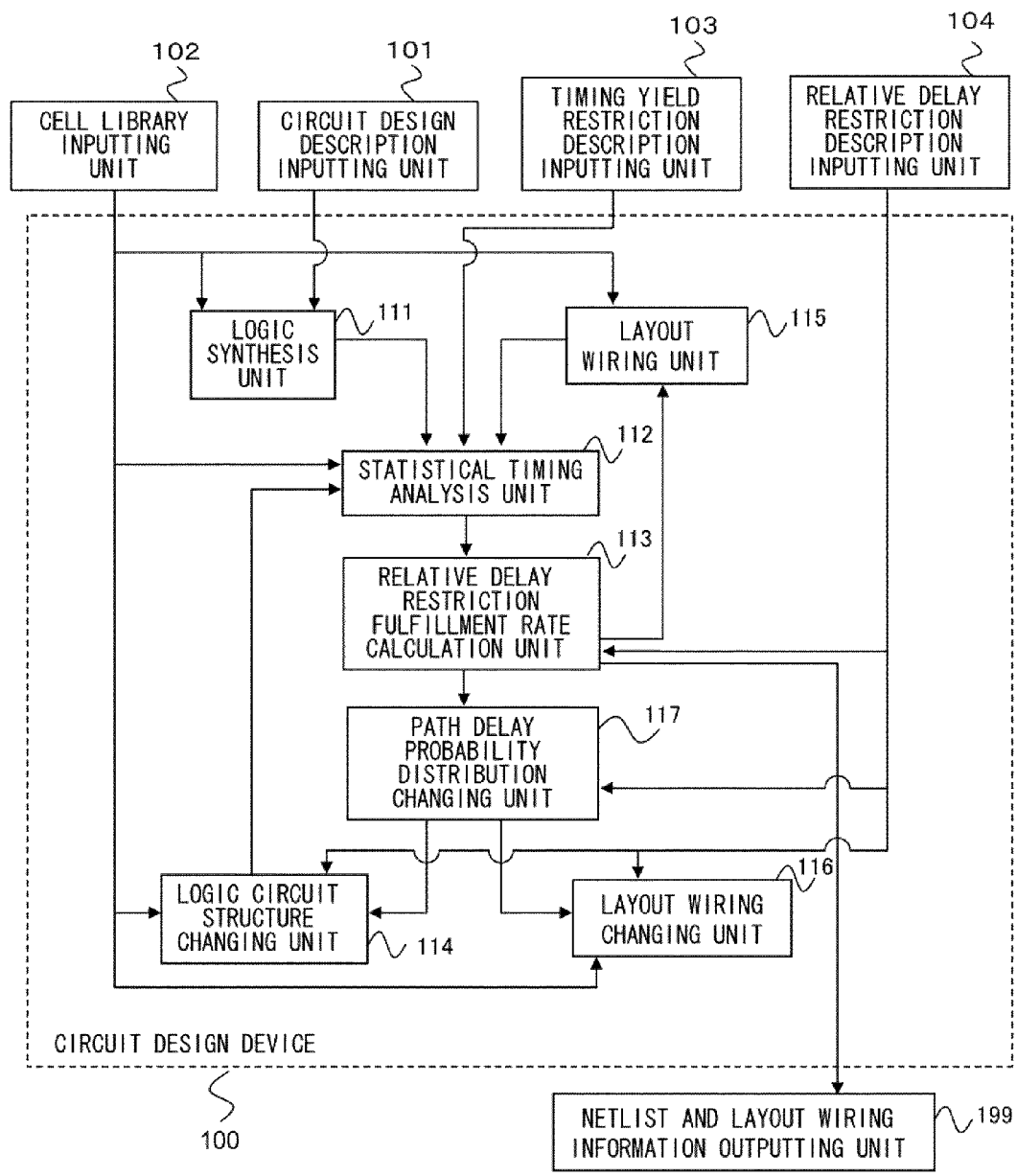
FIG. 1 is a block diagram showing the configuration of an exemplary embodiment of the present invention.

Circuit design device 100 according to an exemplary embodiment of the present invention in FIG. 1 comprises logic synthesis unit 111, statistical timing analysis unit 112, relative delay restriction fulfillment rate calculation unit 113, logic circuit structure changing unit 114, layout wiring unit 115, layout wiring changing unit 116, and path delay probability distribution changing unit 117.

Logic synthesis unit 111 converts an asynchronous circuit design description into a netlist at a gate level. Layout wiring unit 115 arranges elements in the netlist and wires the elements.

Statistical timing analysis unit 112 calculates a delay time of a path in a circuit based on a statistical timing analysis for the netlist or layout wiring information.

Relative delay restriction fulfillment rate calculation unit 113 calculates a fulfillment rate at which a path in a circuit subjected to a relative delay restriction fulfills the restriction.

When the fulfillment rate does not reach a predetermined timing yield restriction, path delay probability distribution changing unit 117 calculates a probability distribution of delay values of a path when a fulfillment rate reaches the timing yield restriction as a changed probability distribution.

Logic circuit structure changing unit 114 or layout wiring changing unit 116 changes the logical structure or physical structure of a circuit so that the probability distribution of the delay value of a path becomes the changed probability distribution.

According to the configuration described above, the object of the present invention is achieved by keeping a timing margin between delay values of paths subjected to a relative delay restriction to a required minimum in order to achieve a predetermined yield.

A circuit design system according to an exemplary embodiment of the present invention (a system including a circuit design device according to the present exemplary embodiment) will be described in detail with reference to the drawings.

In FIG. 1, the circuit design system according to an exemplary embodiment of the present invention includes circuit design device 100, circuit design description inputting unit 101, cell library inputting unit 102, timing yield restriction description inputting unit 103, relative delay restriction description inputting unit 104, and netlist and layout wiring information outputting unit 199.

Circuit design device 100 includes logic synthesis unit 111, statistical timing analysis unit 112, relative delay restriction fulfillment rate calculation unit 113, logic circuit structure changing unit 114, layout wiring unit 115, layout wiring changing unit 116, and path delay probability distribution changing unit 117.

An operation of each units constituting an exemplary embodiment of the present invention will be summarized below.

Circuit design description inputting unit 101 inputs, to the circuit design device 100, an asynchronous circuit design description that describes the order in which control signals in the circuit represented by handshake signals transit, processing performed in a logic circuit between a latch and flip-flop, and a control procedure of the latch and the flip-flop for the control signal transition.

Cell library inputting unit 102 inputs, to the circuit design device 100, a cell library that describes logic information and physical information of an element and wiring constituting the asynchronous circuit, which is the design object, and information used for calculating delay values.

Furthermore, information on variation in delay values of the element and wiring may be described in the cell library as part of the cell library information. However, based on basic information described in the cell library, the variation information may be derived by any one of logic synthesis unit 111, statistical timing analysis unit 112, relative delay restriction fulfillment rate calculation unit 113, logic circuit structure changing unit 114, layout wiring unit 115 or layout wiring changing unit 116.

Timing yield restriction description inputting unit 103 inputs, to the circuit design device 100, a timing yield restriction description that describes a restriction regarding the yield of an asynchronous circuit, which is the design object.

Relative delay restriction description inputting unit 104 inputs, to the circuit design device 100, a relative delay restriction description that describes a relative delay restriction in the circuit.

Netlist and layout wiring information outputting unit 199 outputs a netlist, and an element layout and wiring of an asynchronous integrated circuit designed by circuit design device 100.

Logic synthesis unit 111 generates a netlist of a circuit constituted by elements described in the cell library at a gate level based on an inputted circuit design description and cell library of an asynchronous circuit.

Based on the netlist, the cell library, and the layout wiring information, statistical timing analysis unit 112 calculates a probability density function of delay values of a path in the asynchronous circuit or a statistic that characterizes the delay values in a predetermined probability distribution model, and outputs the result as a statistical delay information of the path.

It is possible to perform a statistical timing analysis without using the layout wiring information.

Relative delay restriction fulfillment rate calculation unit 113 determines whether or not the fulfillment rate of the relative delay restriction satisfies the timing yield restriction based on the statistical delay information, the relative delay restriction description, and the timing yield restriction description.

Based on statistical path delay value information and a calculation rule for the joint probability distribution of a plurality of probability variables, path delay probability distribution changing unit 117 derives a probability density function (or a feature value of the probability distribution) of delay values satisfying the timing yield restriction as a changed probability density function for a path subjected to the relative delay restriction.

Based on the netlist, the statistical delay information, timing yield unfulfilling path information, the relative delay restriction description, and the changed probability density function (or the feature value of the probability distribution), logic circuit structure changing unit 114 performs combinatorial optimization, inserts a delay element, replaces an element with one with different performance but the same logic, and changes the netlist so that the probability density function (or the feature value of the probability distribution) of the delay value of a timing yield unfulfilling path becomes the changed probability density function (or the feature value of the probability distribution).

From the netlist and cell library, layout wiring unit 115 arranges the elements in the netlist, provides wiring between the elements, and outputs the layout wiring information of the asynchronous circuit.

Based on the netlist, the layout wiring information, the statistical delay information, the timing yield unfulfilling path information, the relative delay restriction description, and the probability density function (or the feature value of the probability distribution), layout wiring changing unit 116 exchanges an element in the circuit with one having the same logic but a different delay value, lengthens/shortens the wiring length, and changes the netlist and the layout wiring information so that the probability density function (or the feature value of the probability distribution) of delay values of a timing yield unfulfilling path becomes the changed probability density function (or the feature value of the probability distribution).

Figure 2:
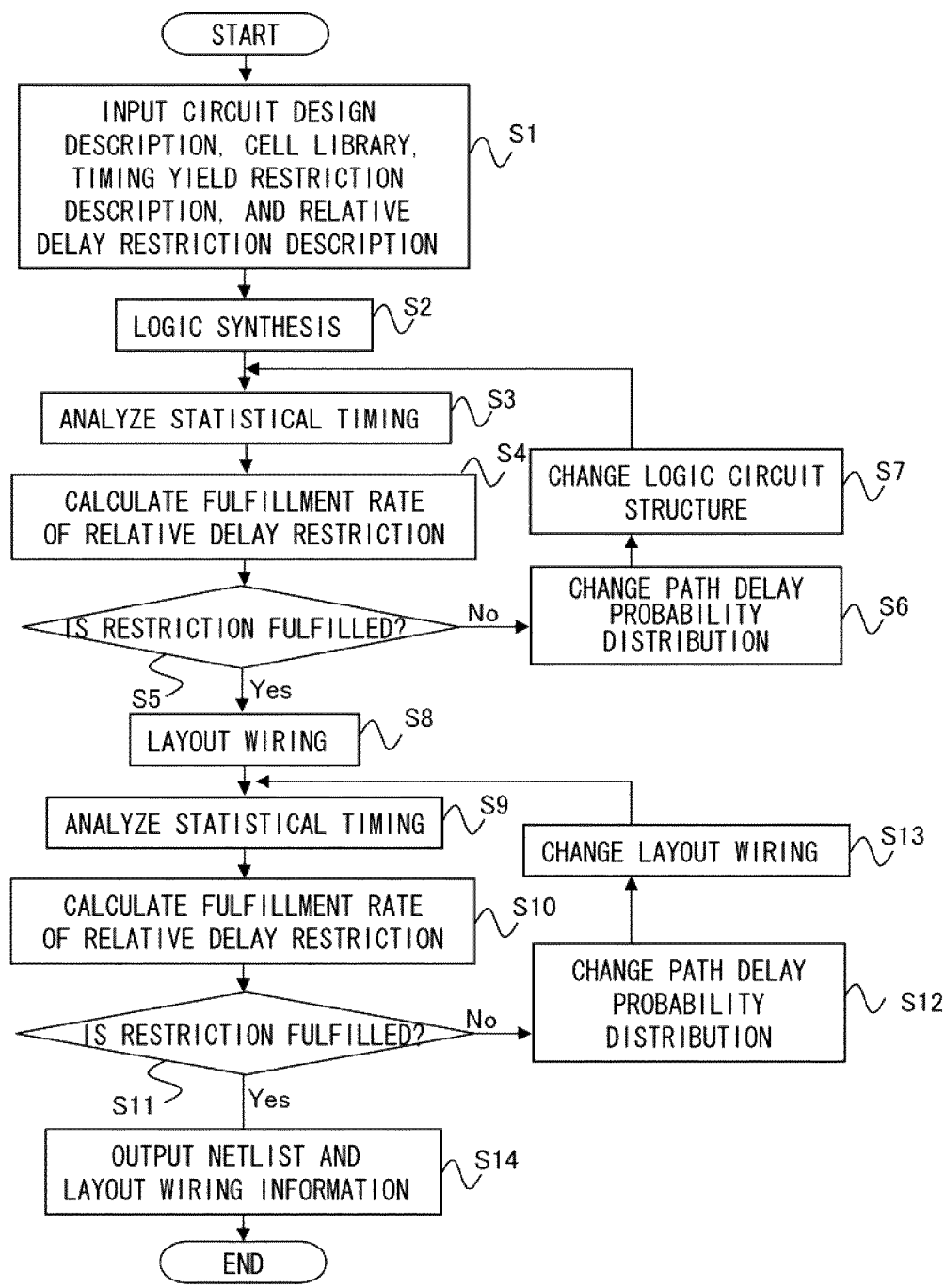
FIG. 2 is a flowchart showing an operation of an exemplary embodiment of the present invention.

Next, an operation of circuit design device 100 according to the present exemplary embodiment will be described in detail with reference to a flowchart in FIG. 2.

Circuit design device 100 receives a circuit design description, a cell library, a timing yield restriction description, and a relative delay restriction description from circuit design description inputting unit 101, cell library inputting unit 102, timing yield restriction description inputting unit 103, and relative delay restriction description inputting unit 104, respectively (step S1).

Logic synthesis unit 111 logically synthesizes a netlist of the circuit constituted by the elements described in the cell library at a gate level from the circuit design description and the cell library (step S2).

Statistical timing analysis unit 112 performs a statistical timing analysis, and generates a probability density function of delay values of a path in the asynchronous circuit (or a statistic that characterizes the probability distribution of delay values in a predetermined probability distribution model) as the statistical path delay value information of this path from the netlist and cell library (step S3).

Here, the "netlist" before the process of step S7 denotes the one generated in step S2, and after the process of step S7 described below, it denotes a changed one.

Based on the statistical path delay value information, the relative delay restriction description, and the timing yield restriction description, relative delay restriction fulfillment rate calculation unit 113 derives a fulfillment rate of the relative delay restriction (step S4), and determines whether or not the timing yield restriction is fulfilled (step S5).

When the timing yield restriction is fulfilled, go to step S8, and when it is not fulfilled, go to step S6.

Path delay probability distribution changing unit 117 derives a probability density function of delay values (or a feature value of the probability distribution) that satisfies the timing yield restriction for a path subjected to the relative delay restriction from the statistical path delay value information (step S6).

From the netlist, the statistical delay value information, the relative delay restriction description, and the changed probability density function (or the feature value of the probability distribution) of the path delay value, logic circuit structure changing unit 114 changes the logical structure of the circuit by decreasing/increasing the path delay value with combinatorial optimization, insertion/deletion of a delay element, and replacement of an element with one having the same logic but different performance so that the probability density function (or the feature quantity of the probability distribution) of the delay value of a path determined to be "unfulfilled" in the timing yield fulfillment judgment becomes the changed probability density function (or the feature value of the probability distribution), and revises the netlist so that the aforementioned changes are reflected in it (step S7).

From the netlist and the cell library, layout wiring unit 115 arranges the elements in the netlist, provides wiring between the elements, and generates a layout wiring information of the asynchronous circuit (step S8).

From the netlist and the layout/wiring information, statistical timing analysis unit 112 generates a probability density function of delay values of a path in the asynchronous circuit (or a statistic that characterizes the probability distribution of delay values in a predetermined probability distribution model) as a statistical delay information of this path (step S9).

It should be noted that the "netlist" and the "layout wiring information" before step S13 denote the netlist and layout wiring information generated in step S8, and after step S13, they denote the changed netlist and layout wiring information.

Based on the statistical path delay value information, the relative delay restriction description, and the timing yield restriction description, relative delay restriction fulfillment rate calculation unit 113 determines whether or not the fulfillment probability of the relative delay restriction fulfills the timing yield restriction (step S10).

As a result of the judgment, when the timing yield restriction is fulfilled, go to step S14, and when it is not fulfilled, go to step S12 (step S11).

Based on the statistical path delay value information, path delay probability distribution changing unit 117 derives a probability density function of delay values (or a feature value of the probability distribution) that satisfies the timing yield restriction for a path subjected to the relative delay restriction (step S12).

Based on the netlist, the layout wiring information, the statistical delay value information, the timing yield unfulfilling path information, the relative delay restriction description, and the probability density function of the changed path delay value (or the feature value of the probability distribution), the layout wiring changing unit 116 changes the layout and the wiring by exchanging an element with one having the same logic but a different delay value and lengthening/shortening the wiring length so that the probability density function (or the statistic of the probability distribution) of the delay value of a path determined to be "unfulfilled" in the timing yield restriction fulfillment judgment becomes the probability density function (or the feature quantity of the probability distribution) of the changed path delay value, and revises the netlist and the layout/wiring information so that these changes are reflected in them (step S13).

Finally, the netlist and layout wiring information outputting unit 199 outputs the netlist and layout wiring information (step S14), and the processing ends.

Next, the effects of the present exemplary embodiment will be explained.

In the present exemplary embodiment, circuit design device 100 is configured as follows. Logic synthesis unit 111 and layout wiring unit 115 generate a netlist of an asynchronous circuit, which is the design object, and a layout/wiring information. Statistical timing analysis unit 112 analyzes the delay value of a path in this circuit that takes variation into consideration. Relative delay restriction fulfillment rate calculation unit 113 determines a fulfillment rate of the relative delay restriction resulted from the analysis. When the timing yield restriction is unfulfilled, path delay probability distribution changing unit 117 determines a probability distribution of the path delay values in the circuit when the restriction is fulfilled as the target of the circuit structure change described later. Logic circuit structure changing unit 114 and layout wiring changing unit 116 change the logical and physical structure of the asynchronous circuit, which is the design object, so that the aforementioned target is achieved.

Therefore, even when variation in delay values of an element and wiring is large, by satisfying the asynchronous circuit-specific restriction regarding the relative relationships between delay values of a plurality of paths in the circuit with a probability greater than a predetermined probability, a predetermined yield can be achieved. Furthermore, an asynchronous circuit design capable of achieving a high yield and high performance can be realized by setting the target so as to keep the timing margin to a minimum to the extent that the timing yield restriction is fulfilled and changing the circuit structure so as to achieve this target.

EXEMPLARY EMBODIMENT

Next, an operation of the circuit design system according to an exemplary embodiment of the present invention will be described using a concrete example.

In the present example, it is assumed that the delay values of elements and wirings and delay values of paths follow a normal distribution, and that delay values of a plurality of elements, wirings, and path are independent to each other.

Furthermore, by properly performing a probability calculation, circuit design device 100 of the present invention operates properly even in cases where a different probability distribution model of delay values is used or where a correlation exists between the delay values of the plurality of elements, wirings, and paths.

Circuit design device 100 receives an asynchronous circuit design description in FIG. 3, a cell library, a timing yield restriction description, and a relative delay restriction description from circuit design description inputting unit 101, cell library inputting unit 102, timing yield restriction description inputting unit 103, and relative delay restriction description inputting unit 104 respectively (step S1).

In the present example, it is assumed that an expected value and a standard deviation is described in the cell library as an information on variation in delay values of an element and wiring.

Furthermore, it is assumed that a restriction that the delay value of a path from top/LC1/Ro1 to top/LC2/Ri2 in FIG. 3 must be larger than the delay value of a path from top/dp/a or top/dp/b to top/dp/c is described in the relative delay restriction description.

Figure 4:
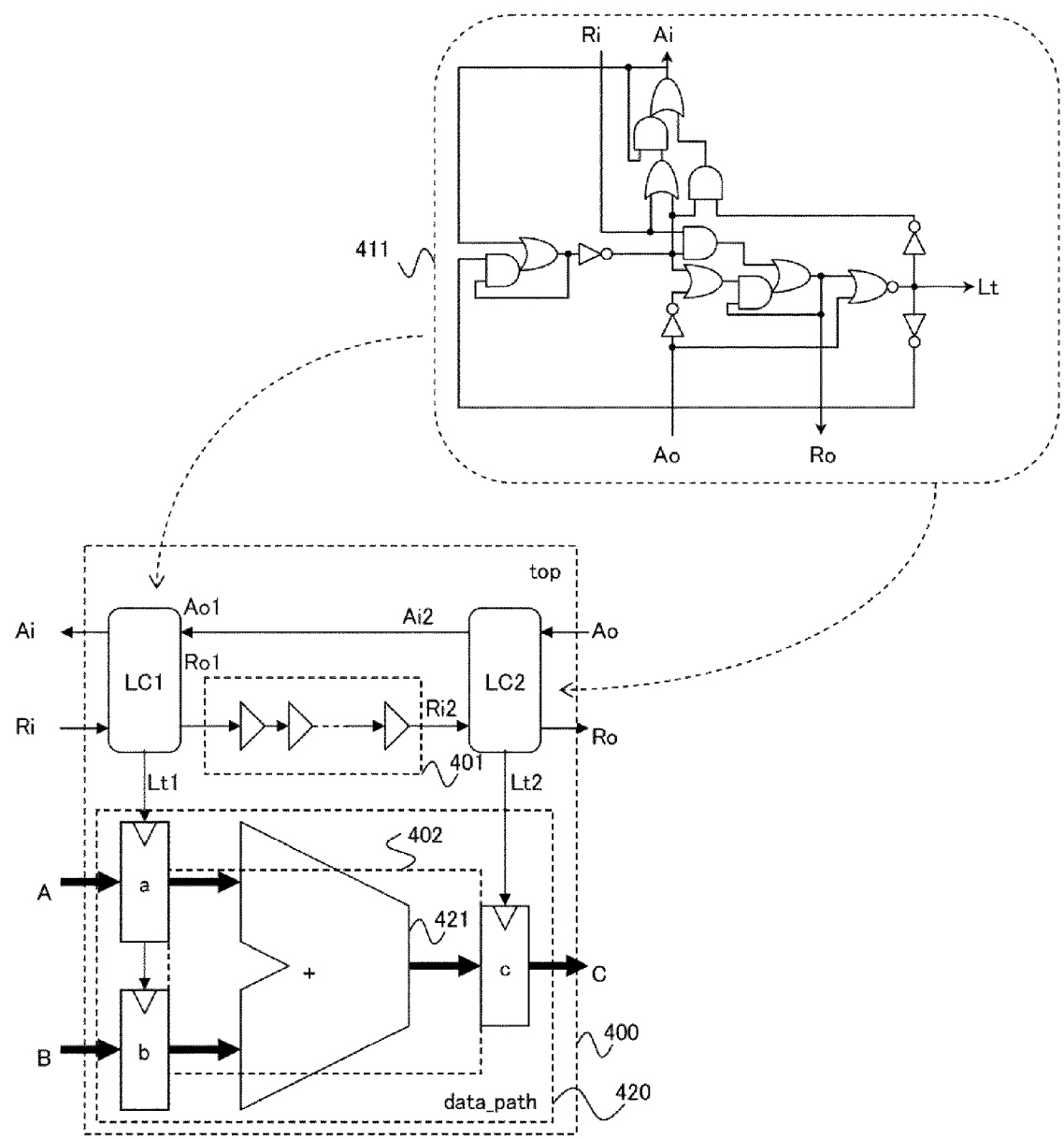
FIG. 4 is a configuration diagram of the asynchronous circuit designed in an example (i.e., designed by the circuit design device according to an example of the present invention).

It is assumed that a restriction that the fulfillment rate of the relative delay restriction must be equal to or greater than 0.99 is described in the timing yield restriction description Logic synthesis unit 111 logically synthesizes a netlist of the circuit having a configuration shown in FIG. 4 at a gate level from the asynchronous circuit design description in FIG. 3 and the cell library (step S2).

Note that FIG. 4 shows configuration 411 of latch control modules (LC1, LC2) constituted by cells, and it is assumed that the cells are in the library.

Similarly, it is assumed that latches (a, b, c) and adder 421 are constituted by cells in the library.

From the netlist and the cell library, statistical timing analysis unit 112 derives a probability distribution of delay values of paths 401 and 402 subjected to a relative delay restriction (step S3). Here, path 401 is a handshake request signal line, and path 402 is a data path.

Figure 5:
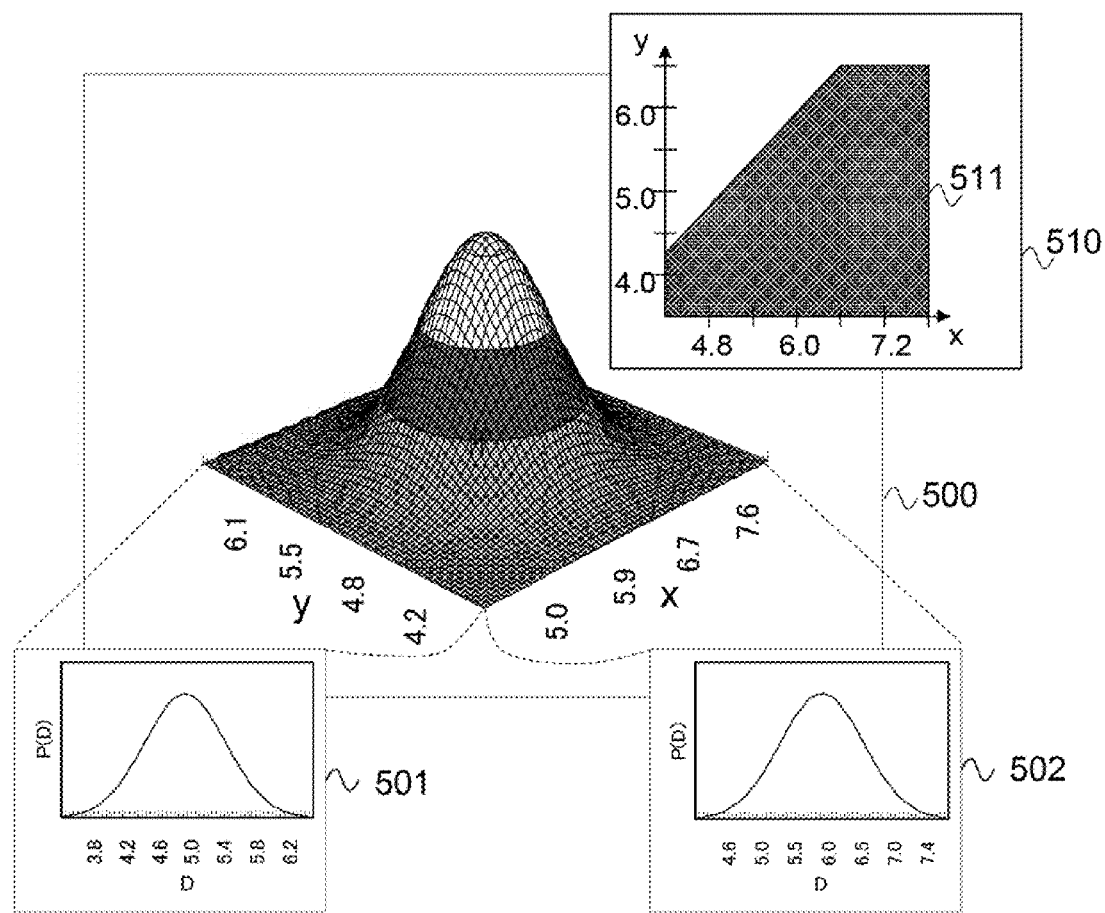
FIG. 5 is a drawing showing judgments of how a relative delay restriction is fulfilled in a process of designing an asynchronous circuit in an example (i.e., a process of designing an asynchronous circuit by a circuit design device according to an example of the present invention).

In the present example, it is assumed that path delay values follow a normal distribution as well. Here, an expected value and a standard deviation that characterize the probability distribution of path delay values are derived. The probability distribution of delay values of path 401 is, for instance, a normal distribution with expected value 5 ns and standard deviation 0.5 ns as shown in a graph 501 in FIG. 5, and the probability distribution of delay values of path 402 is, for instance, a normal distribution with expected value 6 ns and standard deviation 0.6 ns as shown in graph 502.

For a joint distribution 500 of the probability distributions (501 and 502 in FIG. 5) of the delay values of paths 401 and 402 subjected to the relative delay restriction, the relative delay restriction fulfillment rate calculation unit 113 derives a fulfillment rate by integrating the joint distribution 500 for a relative delay restriction fulfilling region 511 that satisfies the relative delay restriction, and determines whether or not the fulfillment rate satisfies the timing yield restriction.

A graph 510 is a drawing of the graph 500 viewed from a z-axis direction.

Assume, for example, that the fulfillment rate obtained by integrating the graph 500 for the relative delay restriction fulfilling region 511 is, for instance, 0.896 (step S4). Since this value is smaller than the timing yield restriction 0.99, it is determined that the timing yield restriction is unfulfilled (step S5).

Since the timing yield restriction is determined to be unfulfilled, go to step S6 (step S5).

Path delay probability distribution changing unit 117 derives an expected value as one of the feature values of the probability distribution of the delay values of paths 401 and 402 in a case where the timing yield restriction is satisfied after the structure of the logic circuit has been changed.

Based on the additivity of an expected value and standard deviation of an independent probability variable, when the expected value of a path delay value becomes "a" times of the initial value by logical optimization, since the standard deviation is predicted to be ($\sqrt{a}$) times of the initial value, the expected value of the delay value of path 401 in the case where the fulfillment rate of the relative delay restriction is equal to or greater than 0.99, which is the timing yield restriction value, is 4.10 ns (5 ns times 0.82), and the expected value of the delay value of path 402 is 7.08 ns (6 ns times 1.18) (step S6).

Since logic circuit structure changing unit 114 tries to reduce the delay value of path 402 out of paths not fulfilling the relative delay restriction in the circuit in FIG. 4, adder 421 performs logical optimization and changes the structure of the logic circuit. Then the netlist is revised.

At this time, the changed expected value 4.10 ns is set as a maximum restriction value of the expected value of the delay value of path 402 in the circuit shown in FIG. 4.

Even after the maximum restriction value has been set, the structure of the logic circuit is changed so that the delay value of path 402 gets reduced as much as possible beyond this restriction, in order to improve the performance even further (step S7).

It should be noted that changing the structure of the logic circuit does not always mean that the maximum restriction value is satisfied.

Returning to step S3, statistical timing analysis unit 112 derives a probability distribution of delay values of paths 401 and 402 subjected to the relative delay restriction from the revised netlist and the cell library.

Assume, for example, that an expected value and standard deviation of delay values of path 402 whose delay value is reduced by logic optimization has become 4.5 ns and 0.47 ns respectively.

Assume that relative delay restriction fulfillment rate calculation unit 113 derives a probability that fulfills the relative delay restriction from the joint distribution of the delay values of paths 401 and 402 subjected to the relative delay restriction in FIG. 4 and obtains a value of approximately 0.972. At this time, since this value is still smaller than 0.99, which is the timing yield restriction value, the timing yield restriction is determined to be unfulfilled (step S5), and the operation goes to step S6.

Assume that path delay probability distribution changing unit 117 recalculates a changed expected value of delay values of path 402 when the structure of the logic circuit is changed the next time responding to the changed delay value of path 401 caused by a change of the structure of the logic circuit, and obtains a value of 6.48 ns as the expected value (step S6).

The logic circuit structure changing unit 114 changes the structure of the logic circuit for paths 401 and 402 in the circuit in FIG. 4 that do not fulfill the relative delay restriction so as to increase the delay time of path 402 by adding a delay element with the changed expected value of 6.48 ns as the target, and changes the netlist (step S7).

At this time, since the increase in the delay value of path 401 degrades the performance, the structure is changed so that the delay value is a minimum value exceeding the changed expected value.

Returning to step S3, statistical timing analysis unit 112 derives a probability distribution of delay values of paths 401 and 402 subjected to the relative delay restriction from the netlist that has been changed again and the cell library.

Assume that an expected value and standard deviation of delay values of path 401 whose delay time has been increased due to the addition of the delay element become 6.6 ns and 0.63 ns respectively as a result.

Assume that relative delay restriction fulfillment rate calculation unit 113 obtains a value of approximately 0.992 as a fulfillment rate obtained by integrating the probability that the relative delay restriction is fulfilled in the joint distribution of the delay values of paths 401 and 402. Since this fulfillment rate is not smaller than the timing yield restriction value 0.99, the timing yield restriction is determined to be fulfilled (step S5), and the operation goes to step S8.

Layout wiring unit 115 arranges the elements in the revised netlist of the circuit in FIG. 4 based on the physical information in the cell library, wires between the elements, and generates a layout wiring information (step S8).

Assume that, as a result of an analysis that statistical timing analysis unit 112 has performed on the delay values of paths 401 and 402 based on the netlist of the asynchronous circuit in FIG. 4 and the layout wiring information, a normal distribution with an expected value 4.75 ns and standard deviation 0.49 ns is obtained for delay values of path 401 in the asynchronous circuit, and a normal distribution with expected value 6.66 ns and standard deviation 0.63 ns is obtained for delay values of path 402 (step S9).

When relative delay restriction fulfillment rate calculation unit 113 obtains a value of 0.988 as the probability that the delay values of paths 401 and 402 satisfy the relative delay restriction in FIG. 4, the timing yield restriction is determined to be unfulfilled (step S11), and the operation goes to step S12.

Path delay probability distribution changing unit 117 derives expected values of the delay values of paths 401 and 402 that satisfy the relative delay restriction after the layout and the wiring has been changed, and obtains values of 4.65 ns and 6.78 ns, respectively (step S12).

Based on the netlist, the layout wiring information, the statistical path delay value information, the timing yield unfulfilling path information, and the relative delay restriction description, layout wiring changing unit 116 changes the layout and the wiring by increasing the delay value of the timing yield unfulfilling path 401 or decreasing the delay value of the corresponding path 402.

In order to avoid performance degradation, the layout and the wiring are optimized by shortening path 401 (step S13).

Assume that statistical timing analysis unit 112 analyzes delay values of path 402 again based on the netlist of the asynchronous circuit in FIG. 4 and the revised layout wiring information, and obtains a normal distribution with an expected value 4.65 ns and standard deviation 0.48 ns as delay values of path 401 in the asynchronous circuit (step S9).

Relative delay restriction fulfillment rate calculation unit 113 obtains a value of 0.991 as the probability that delay values of paths 401 and 402 satisfy the relative delay restriction in FIG. 4, and since the timing yield restriction is determined to be fulfilled (step S11), the operation goes to step S14.

Finally, netlist and layout wiring information outputting unit 199 outputs the netlist and layout wiring information of the circuit in FIG. 4 (step S14), and the processing ends.

According to the present example, the following effects can be obtained. Based on the probability distribution of the delay value of a path in the circuit obtained by statistical timing analysis unit 112, for paths 401 and 402 subjected to the relative delay restriction, path delay probability distribution changing unit 117 sets a target value for the expected value of the path delay values when the structure of the logic circuit and the layout wiring are changed. Logic circuit structure changing unit 114 and the layout wiring changing unit 116 change the circuit structure so as to minimize the delay value of path 402 whose delay value should be decreased in the relative delay restriction, reset the aforementioned target value according to the change of the structure of the circuit, then changes the circuit structure so that the delay value of path 401 whose delay value should be increased is a minimum value that exceeds the target value. By the process described above, the performance of circuit 400 in FIG. 4 is maximized to the extent that the predetermined timing yield restriction is satisfied.

Furthermore, by using a normal distribution as the probability distribution model for the path delay value and characterizing the probability density function of the path delay value with an expected value and standard deviation, setting a target for optimizing the probability distribution of the delay values of paths 401 and 402 at the time of the logic and layout wiring optimization is simplified.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A circuit design device designing a circuit that includes a plurality of paths subjected to a restriction regarding the relative amounts of their delay times, termed "relative delay restriction" hereinafter, the circuit design device comprising:
    a statistical timing analysis unit that derives a probability distribution of delay times of each path included in the circuit;
    a relative delay restriction fulfillment rate calculation unit that derives a fulfillment rate of the relative delay restriction by integrating a region of a joint distribution of the probability distributions of delay times of a pair of paths, termed "restricted path pair" hereinafter, subjected to the relative delay restriction, wherein the region satisfies the relative delay restriction;
    a path delay probability distribution changing unit that changes the probability distribution of delay times of each path of the restricted path pair to a changed probability distribution when the fulfillment rate does not reach a predetermined rate; and
    a logic circuit structure changing unit that changes the structure of the circuit with reference to the changed probability distribution.

2. The circuit design device as defined in claim 1, comprising a logic synthesis unit that generates the circuit with reference to a circuit design description.

3. The circuit design device as defined in claim 1, comprising a control unit that controls so that the fulfillment rate reaches the predetermined rate by repeatedly operating the statistical timing analysis unit, the relative delay restriction fulfillment rate calculation unit, the path delay probability distribution changing unit, and the logic circuit structure changing unit.

4. The circuit design device as defined in claim 3, wherein the control unit changes the probability distribution of delay times so as to decrease a delay time of a path, out of the restricted path pair, subjected to the relative delay restriction that its delay time is shorter than that of the other path, and derives the fulfillment rate; and when the fulfillment rate does not reach the predetermined rate, the control unit changes the probability distribution of delay times so as to increase the delay time of a path, out of the restricted path pair, subjected to the relative delay restriction that its delay time is longer than that of the other path.

5. The circuit design device as defined in claim 1, wherein the relative delay restriction fulfillment rate calculation unit derives the fulfillment rate based on a joint probability distribution where a signal transmission is completed in a path, out of the restricted path pair, subjected to the relative delay restriction that its delay time is shorter than that of the other path, and signal transmission is not completed in a path, out of the restricted path pair, subjected to the relative delay restriction that its delay time is longer than that of the other path.

6. The circuit design device as defined in claim 5, wherein the fulfillment rate is derived based on a probability distribution of delay times of each path of the restricted path pair and a correlation between the probability distributions.

7. The circuit design device as defined in claim 4, wherein a statistic that characterizes a probability distribution is used as the changed probability distribution.

8. The circuit design device as defined in claim 1, wherein the statistical timing analysis unit derives a probability distribution of delay times of a path in the circuit referring to a predetermined probability density function of delay times of an element and wiring.

9. The circuit design device as defined in claim 8, wherein the statistical timing analysis unit forces delay times of an element, wiring, and path in the circuit to regress to a predetermined probability distribution model.

10. The circuit design device as defined in claim 9, wherein the statistical timing analysis unit chooses a normal distribution as the probability distribution model and calculates a delay time of a path in the circuit using an expected value and standard deviation as feature values of the probability density function.

11. The circuit design device as defined in claim 2, wherein
the logic synthesis unit generates a netlist at a gate level based on an asynchronous circuit design description;
the timing analysis unit derives a probability distribution of delay times of a path based on the netlist or a layout wiring information; and
the device comprises a layout wiring unit that arranges an element in the netlist and wires between elements, and a layout wiring changing unit that changes a physical structure of the circuit.

12. A computer-implemented circuit design method designing a circuit that includes a plurality of paths subjected to a restriction regarding relative amounts of their delay times, termed "relative delay restriction" hereinafter, the method comprising:
(a) using a computer to generate the circuit based on a circuit design description;
(b) using the computer to derive a probability distribution of delay times of each path included in the circuit;
(c) using the computer to derive a fulfillment rate of the relative delay restriction by integrating a region of a joint distribution of the probability distributions of delay times of a pair of paths, termed "restricted path pair" hereinafter, subjected to the relative delay restriction, wherein the region satisfies the relative delay restriction;
(d) using the computer to change the probability distribution of delay times of each path of the restricted path pair to a changed probability distribution when the fulfillment rate does not reach a predetermined rate; and
(e) using the computer to change the structure of the circuit with reference to the changed probability distribution.

13. The computer-implemented circuit design method as defined in claim 12, including:
(f) repeating the steps (b) to (e) until the fulfillment rate reaches the predetermined rate.

14. The computer-implemented circuit design method as defined in claim 13, wherein, in step (f), the probability distribution of delay times is changed so as to decrease the delay time of a path, out of the restricted path pair, subjected to the relative delay restriction that its delay time is shorter than that of the other path, and the fulfillment rate is derived; and when the fulfillment rate does not reach the predetermined rate, the probability distribution of delay times is changed so as to increase the delay time of a path, out of the restricted path pair, subjected to the relative delay restriction that its delay time is longer than that of the other path.

15. The computer-implemented circuit design method as defined in claim 12, wherein, in said step (c), the fulfillment rate is derived based on a joint probability distribution where a signal transmission is completed in a path, out of the restricted path pair, subjected to the relative delay restriction that its delay time is shorter than that of the other path, and a signal transmission is not completed in a path, out of the restricted path pair, subjected to the relative delay restriction that its delay time is longer than that of the other path.

16. The computer-implemented circuit design method as defined in claim 15, wherein, in said step (c), the fulfillment rate is derived based on a probability distribution of delay times of each path of the restricted path pair and a correlation between the probability distributions.

17. The computer-implemented circuit design method as defined in claim 14, wherein a statistic that characterizes a probability distribution is used as the changed probability distribution in said step (d).

18. The computer-implemented circuit design method as defined in claim 12, wherein a probability distribution of delay times of a path in the circuit is derived referring to a predetermined probability density function of delay times of an element and wiring in said step (b).

19. The computer-implemented circuit design method as defined in claim 18, wherein delay times of an elements, wiring, and path in the circuit are forced to regress to a predetermined probability distribution model in said step (b).

20. The computer-implemented circuit design method as defined in claim 19, wherein a normal distribution is chosen as the probability distribution model and the delay time of a path in the circuit is calculated using an expected value and standard deviation as feature values of the probability density function in said step (b).

* * * * *